L. H. FAUNCE.
Protecting Crops from the Chinch-Bug.
No. 155,644. Patented Oct. 6, 1874.
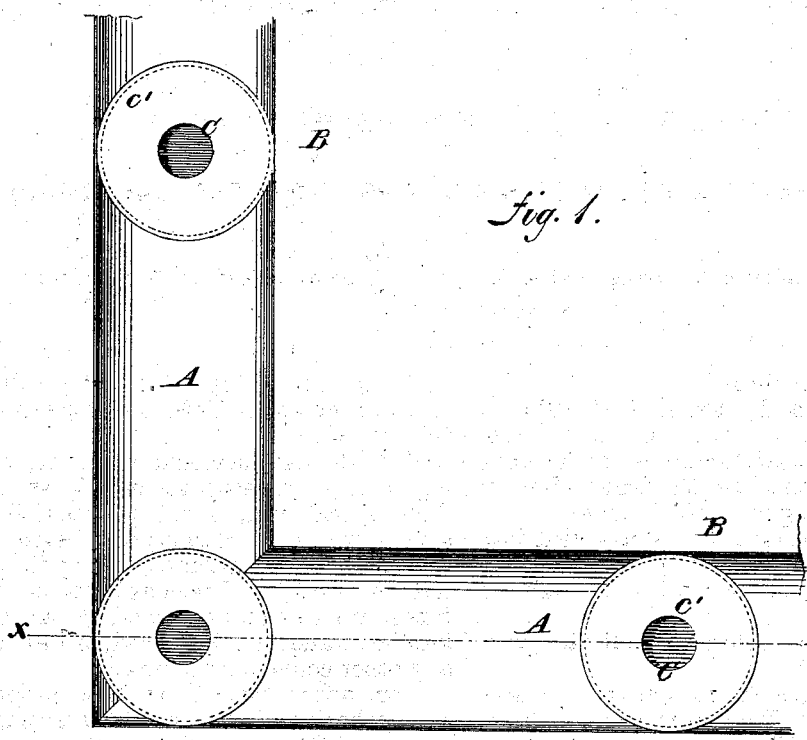
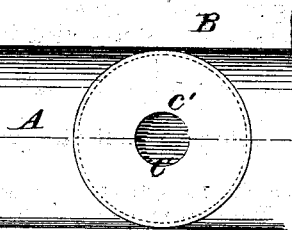
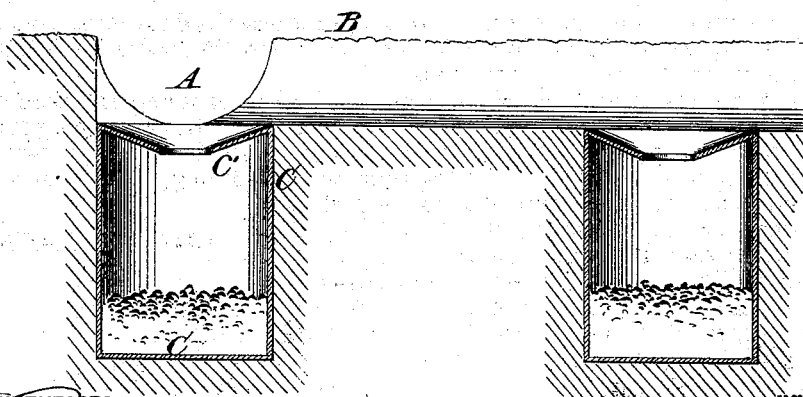

UNITED STATES PATENT OFFICE.

LEMAN H. FAUNCE, OF MONTROSE, ILLINOIS.

IMPROVEMENT IN PROTECTING CROPS FROM THE CHINCH-BUG.

Specification forming part of Letters Patent No. 155,644, dated October 6, 1874; application filed August 10, 1874.

*To all whom it may concern:*

Be it known that I, LEMAN H. FAUNCE, of Montrose, Effingham county, Illinois, have invented a new and useful Improvement in Mode of Preserving Crops from the Chinch-Bug, of which the following is a specification:

Figure 1 represents a corner of a field protected in my improved mode; and Fig. 2 is a detail section of the same taken through the line $x$ $x$, Fig. 1.

Similar letters of reference indicate corresponding parts.

My invention has for its object to enable farmers to protect their growing crops from being destroyed by the chinch-bug, which commits such terrible ravages in some parts of the country.

The invention consists in the means employed for protecting the crops, as hereinafter fully described.

In carrying my invention into practical effect, I form a ditch, A, about a foot deep around the field B in which the crop is growing, or in which the bugs have been hatched. The ditch is formed by plowing two or three furrows or times in the same place, and then drawing a small log along the ditch until the dirt is reduced to fine dust. In the bottom of the ditch A, a rod, more or less, apart, are set small tin cans C. Quart cans are a very convenient size. The cans C are made with funnel-shaped tops $c'$, which tops may project beyond the cans as flanges, if desired. The cans are sunk in the bottom of the ditch until their tops are a little below the surface of the ground.

With this arrangement the bugs, in seeking to enter or leave the field, pass into the ditch A, and, being unable to ascend the other side of the ditch readily, they begin, after a time, to pass longitudinally along it, and fall into the cans C. The cans C, at convenient times, are taken up and the bugs are emptied into hot water and destroyed, or destroyed in any other convenient manner.

I am aware that it has been proposed to entrap the chinch-bug when they are migrating from one field into another by digging a trench before them, up the crumbling dirt of the sides of which they are unable to climb thus arresting their progress, and rendering possible the destruction of the entire colony by means of fire.

Having thus described my invention, I claim as new and desire to secure by Letters Patent—

The combination of funnel-mouthed cans or vessels with a ditch, the same being arranged in the bottom thereof for the purpose of entrapping the chinch-bug, as and for the purpose described.

LEMAN H. FAUNCE.

Witnesses:
    Dr. H. G. VAN SANDT,
    Z. C. BROWNING.